Inventor:
Alfred Kraft
BY
Stephens, Huettig and O'Connell
ATTORNEYS

Inventor:
Alfred Kraft

United States Patent Office 3,598,537
Patented Aug. 10, 1971

3,598,537
CONTINUOUS LIQUID EXTRACTION OF SOLUBLES FROM SOLIDS
Alfred Kraft, Kronberg, Taunus, Germany, assignor to Metallgesellschaft Aktiengesellschaft, Frankfurt am Main, Germany
Filed June 5, 1968, Ser. No. 734,606
Int. Cl. B01d *11/02, 15/02, 21/10*
U.S. Cl. 23—272.5         3 Claims

ABSTRACT OF THE DISCLOSURE

Liquids and solid material are in countercurrent flow through a plurality of mixing zones of which one is composed of a plurality of pockets interconnected with each other. Solid material is periodically passed through each pocket and partially recycled, while extracted material is withdrawn. Overall extraction time is substantially lessened.

---

This invention relates to a method and apparatus for continuously extracting soluble components from solid granular materials and other like operations for precipitating solids from a liquid. Such other operations for the liquid separation of soluble components from granular solids are, for example, the regeneration of a used granular absorption or exchange material.

Conventional processes used for the solvent extraction of components from solid materials, such as in the processes for obtaining oils and fats from oil seed, the harmone extraction from natural substances, or the like. This invention is disclosed relative to the extraction of ε-caprolactam from nylon-6-granules or chips.

This invention is an improvement on the method and apparatus for the continuous separation in the liquid phase with the aid of a solid ion exchange or absorption material such as disclosed in German patent application K 45 354 IVa/12d, filed Dec. 4, 1961.

With strict regard to practical techniques, such as the velocity of diffusion for solid-liquid extraction in consideration of the volume and dwell time, it has been found that the continuous liquid extraction of solubles from granular solid material can be used not only for the regeneration of ion exchange material, but can be used for the soluble components of solid material, such as the extraction of oil from oil seed or the extraction of ε-caprolactam from the polymeric nylon-6-granules or chips.

The apparatus of this invention is usable for the elution of activated charcoal or granular catalysts.

The method of this invention is disclosed in detail for the extraction of lactam from nylon-6-granules or chips.

When viewed as a molecular exchange of matter, the non-phase-like extractions simply obey the 2nd Law of Diffusion of Fick.

For the one-dimensional diffusion direction, this invention uses the following partial differential equation of the Second Order:

$$-k = \frac{d^2c}{dx^2} = \frac{dc}{du}$$

with:
$k$ = diffusion constant (m.²/h.)
(—) because of the reduction of concentration on the granules or chips
$d^2c/dx^2$ = partial differential quotient of the drop of the concentration in the direction of diffusion $x$ (1/m.²)
$dc/dx$ = change of concentration with regard to time (1/h.).

At the start, the left side of the equation represents the difference in the quantities of lactam from the granules or chips which diffuse per unit of time out of two opposite lying border layers of a volumetric unit of the liquid as, for example, the extraction water. The right side of the equation corresponds to the quantity of lactam which is extracted from this volumetric unit during the time of extraction because of the diffusion caused by the extraction water.

At this point, it is not necessary to give the integration of the differential equation and the solution equations.

In considering the method and/or the apparatus, the following are determinative:

(1) The diffusion constant $k$ can, for a definite case, be raised only by an operational temperature increase, or by a suitable extraction liquid, or by the addition of extraction additives such as solvents to the extraction liquid.

(2) The concentration drop $dc/dx$ between the granules or chips and the water extraction can be kept large, for all practical purposes, only by means of a low lactam concentration in the extraction water and/or by means of a shorter diffusion path length $dx_1$, or in other words, by reducing the size of the granules or chips and a minimum border layer strength of the extraction $dx_2$ on the granules or chips.

In the case of using a multi-step extraction, the preliminary and main extraction should really be appropriately accomplished without any disturbing swirling agitation and/or short-circulated flow since the concentration difference between the introduced granules or chips and the extraction water can be held to an optimum degree when a recycling or feedback mixing of the extraction water is prevented.

As an extraction proceeds with a gradual reduction in the concentration difference, it is possible to improve the concentration drop $dc/dx$ by an intensive mixing and because the extraction border layers $dx_2$ between the granules or chips and extraction water is held as small as possible, as, for example, by means of turbulence.

(3) The liquid-solid extraction, because of being dependent upon the lactam concentration in the granules or chips capillaries and/or in the extraction water and because the seal of the low diffusion velocity in the liquid, is a time-dependent technique. This applies also to fine-grained granules or chips and even under increased temperatures, which is the reason that special attention is given to the dwell time in the apparatus.

(4) Containers which are connected and switched behind each other and holding the granules or chips through which hte liquid flows continuously without agitation are well-suited for obtaining a uniform dwell time for the gradual extraction and simultaneously a uniform residual granules or chips concentration. At this point, it is impossible to prevent a lactam film deposit on the granules or chips so that a following relatively high final granules or chips concentration is required. Consequently, in order to obtain the finest degree of extract, it is necessary to have a following or several mixing steps in the apparatus in order to rinse off the residual lactam content.

This is especially true for the final treatment steps for the granules or chips which are obtained by an intensive mixing or swirling of the granules or chips or at least an increased extraction water velocity to satisfy the requirements of this invention.

Since, in the final granules or chips treatment steps, the concentration difference $dc$ is relatively low, it has been found that the concentration drop $dc/dx$ and thus the extraction effect is increased by hydraulic techniques. In this manner, it is again possible to reduced the treatment time for achieving a definite residual extract content on the granules or chips and/or to considerably reduce the residual content during the treatment time. To accomplish this, the extraction liquid, with zero concentration if possible, is introduced in countercurrent flow into the final granules or chips extraction zone.

Starting with the apparatus disclosed in German patent application K 45 354, this invention produces an apparatus for the continuous separation in countercurrent flow of solubles from solids or for the elution of granules.

The apparatus is an open top round container having a spill-over upper edge. In the container, there is a cylindrical central tube having a conically expanded lower end and facing and surrounding a guide tube having a conically expanding discharge end facing the bottom of the container. Radially extending walls between the central tube and the wall of the container divide the space into a plurality of pockets with their pertinent communicating channels. These pockets are in communication with a bottom mixing zone at the bottom of the container in the area of the conically expanded central tube and above which is a sedimentation zone within the area of the central tube. These pockets have openings which can be closed. A centrifugal pump in the mixing zone as well as in the sedimentation zone agitates the mixture. Liquid at a rate as introduced into the mixing zone is moved to and from the sedimentation zone and through the pockets and finally removed at the spill-over.

The solid material to be treated is introduced into the pockets which are filled and/or discharged in a cycle into the mixing zone.

The treated solid matter is removed from time to time from the bottom of the container after being rinsed in the mixing zone by using a conical discharge valve in the bottom of the container.

The openings which connect the pockets with the mixing zone and/or the pockets with the spill-over are arranged within the range of the liquid level and are connected by plug-like discs or other suitable valves which may be automatically actuated.

Also on the same liquid level are connections between the individual pockets and the corresponding closures by means of which the liquid can be conducted from the sedimentation zone through several pockets, one after the other, before it reaches the spill-over.

By means of a programmed switch control, hereinafter described, of the valves in the openings within the liquid level range, it is possible to subject the solid matter in the pockets to a true counterflow extraction in which solid matter poor in extracts comes into contact with the extraction media poor in extracts and where solid matter rich in extracts comes into contact with solvent media that has already been enriched.

The means by which the objects of this invention are described more fully with reference to the accompanying drawings in which.

Figure 1:
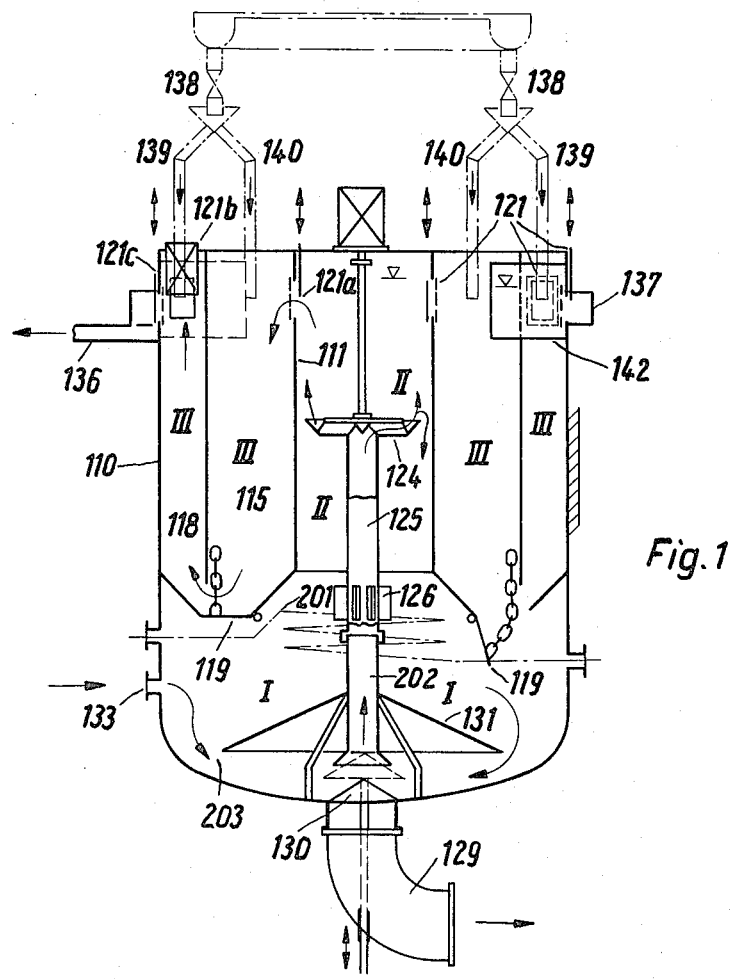
FIG. 1 is a vertical cross-sectional view through the apparatus.

The apparatus is described, for example, for the continuous extraction of lactam from nylon-6-granules or chips.

In the central mixing zone I of the container 110, demineralized water at a temperature of generally 90 to 100° C. is introduced through pipe 133. However, the water can be heated inside the container by means of, for example, a steam-heated coil 201 and maintained to the desired temperature by suitable controls.

The introduced water is conducted through zones I, II and III and collected in the annular spill-over channel 137 from which it is discharged through pipe 136. The flow and movement of the water and the actuating of the baffles and valves are described as follows.

The untreated granules or chips are continuously fed into the top of the container through valves 138 and pipes 139 and 140 into the chambers 115 and 118 located in the respective pockets. There are, for example, six pockets 1 to 6 in zone III. The granules or chips are introduced according to a definite program and also can be flown in.

Figure 5:
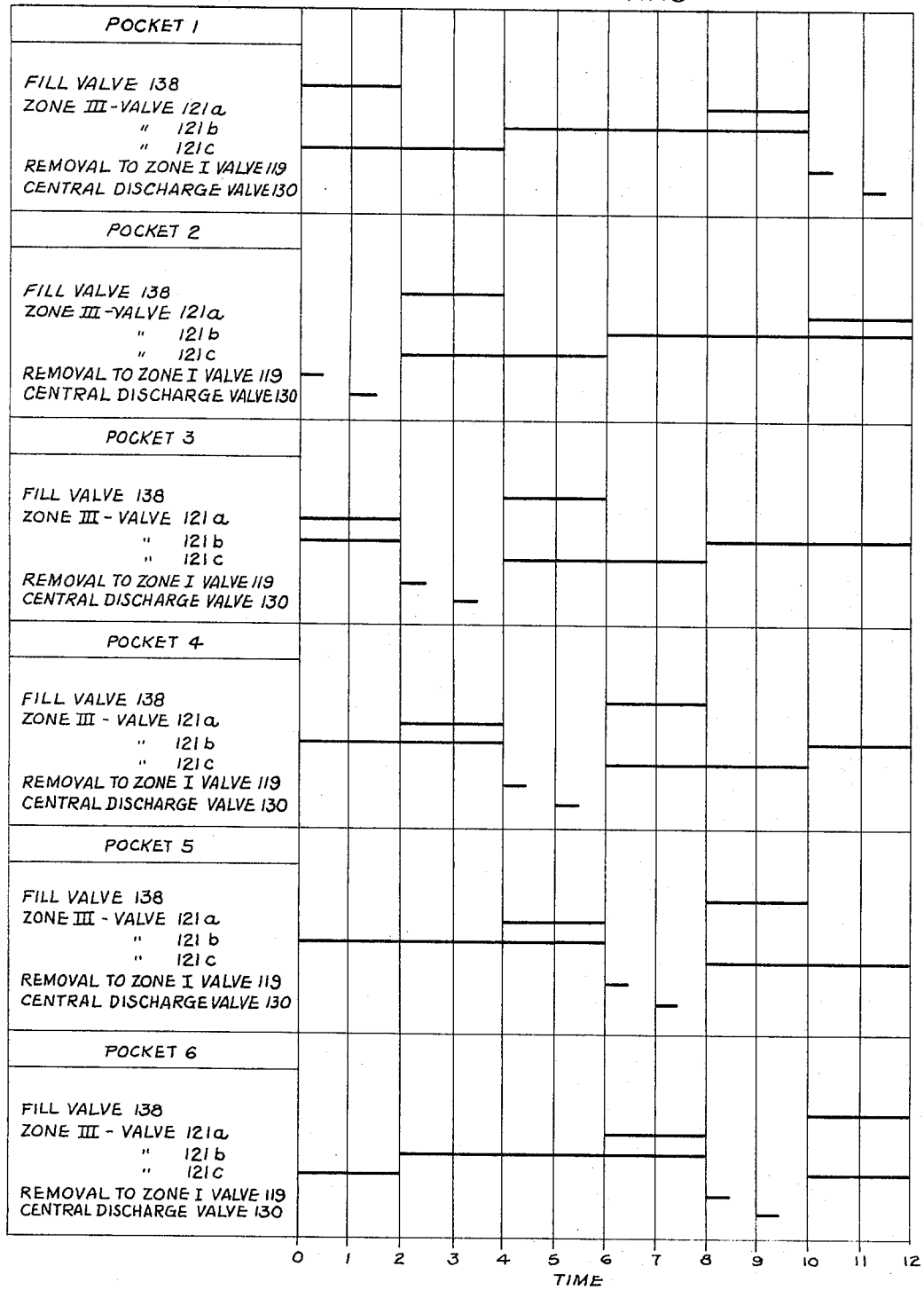
FIG. 5 is a table of the program switch control.

In the control circuit rhythm as shown in FIG. 5, the discs or valves 121a to 121c are switched and/or reset so that at all times several pockets are connected and the demineralized water continuously flows through the granules or chips beds so that lactam is extracted therefrom.

The granules or chips which have to a great extent been previously extracted are removed in the same rhythm by opening the trap door bottoms 119 of the pockets 1 to 6 and dumped into zone I. Here the granules or chips are caught by the turbulent flow produced by the central swirl pump 124 and drawn up from the center of the bottom through the guide tube 202 and the suction sleeve 125 and poured into zone II. Here an intensive backflow takes place to zone I since the conveying capacity of pump 124 is considerably higher than the quantity of demineralized water constantly introduced through pipe 133. The ratio is appropriately from 10 up to 20 to 1. In this backflow, all the granules or chips at the same time are moved back.

The further liquid upward flow in zone II has such a velocity that no granules or chips are carried along. This is determined by the cross-sectional area of zone II, the amount of demineralized water entering through pipe 133 and the sinking velocity of the granules or chips in the extracting liquid. In order to safeguard against the overflow of granules or chips, mesh-type sieves are placed in front of all valves.

The downflowing liquid including the granules or chips is now caught by the turbulent flow of the agitator blades 126 and intimately mixed with the incoming hot demineralized water, thus increasing the extraction rate. In this instance, it is very advantageous that the velocity of the liquid is increased through the heating coil 201 and is thus heated and/or maintained at a specially desired temperature.

The granules or chips which have dropped further down are diverted outwardly by the conical member 131 adjacent the bottom of container 110 and from there moved spirally through the opening 203 between the conical member and the bottom of the container and again drawn upwardly into zone II so that the liquid and granules or chips are intensively swirled, together with a repeated heating of the liquid, continuously and repeatedly. In this manner, the granules or chips travel a long flow path and no dead zones or deposits are formed.

In the course of the intensive and uniform treatments in zones I and II, in addition to the continuous counterflow extraction in the pockets of the following zone III, there is obtained a further and surprisingly good extraction of the residual lactam from the granules or chips.

A benefit is derived in this instance from the fact that the lactam concentration in the granules or chips has already been greatly reduced by the counterflow extraction in zone III during the previous steps in the control program.

Figure 2:
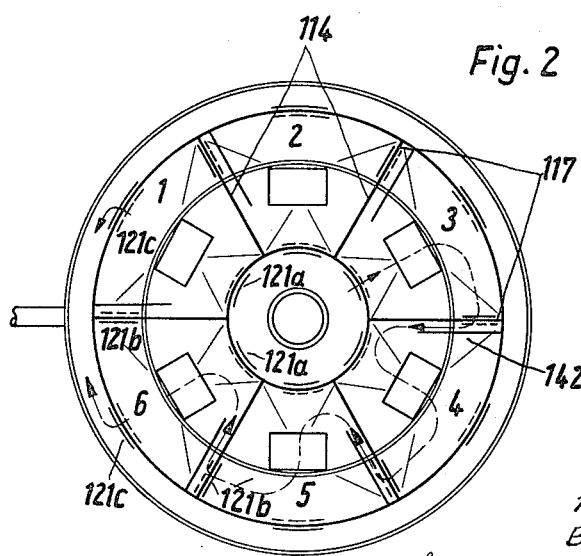
FIG. 2 is a plan view of FIG. 1.
Figure 3:
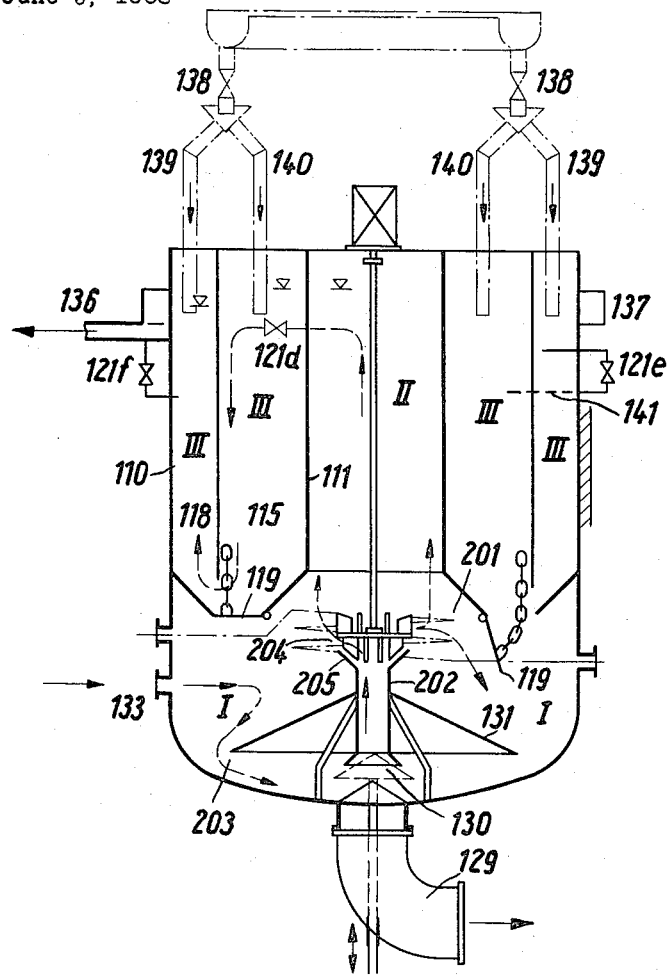
FIG. 3 is a vertical cross-sectional view of a modified form of the invention.
Figure 4:
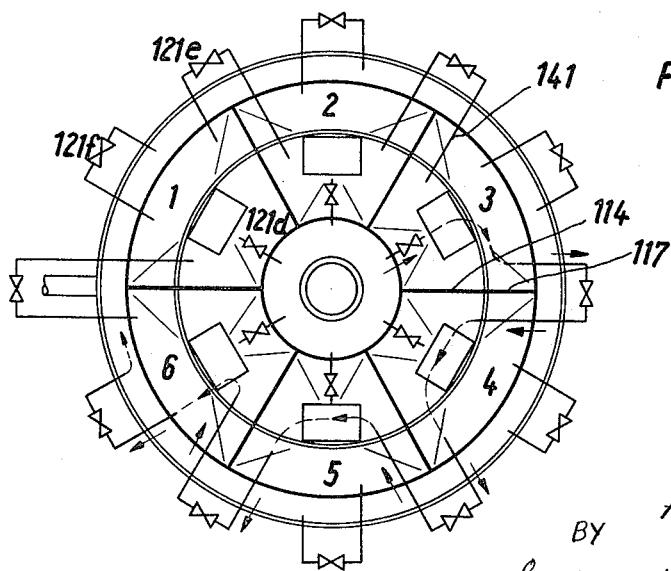
FIG. 4 is a plan view of FIG. 3.

FIGS. 3 and 4 show the guidance of the liquid through the six pockets of zone III as well as the switching of the valves 121a to 121c. The valves in FIGS. 1 and 2 are operated in an analogous manner.

The extraction water flows as heretofore described into zone I through pipe 133 and moves upwardly through zone II to be able to flow out of the container 110.

For the purpose of flowing into the six pockets in zone III, only one valve 121a, as, for example, pocket 3, is open for each control step. The liquid flows subsequently downward, always in chamber 115 of this pocket and finally upwardly in chamber 118.

For the purpose of spilling into following pockets, as, for instance, into pocket 4, as seen in a clockwise direction in FIG. 2, the respective valve 121b of this following pocket is open. A pipe 141 is connected to the valves so that the liquid can now flow from chamber 118 in pocket 4 to the chamber 114 of the following pocket 5. The pipes 141 are provided in each pocket but are opened only in conjunction with the respective valve 121b.

As shown in FIGS. 1 and 2, a channel or gutter 142 is used as the connection from chamber 118 to chamber 115 for the following pocket instead of using a pipe.

The liquid which has already passed through the granules or chips in the pocket 3 now flows into pocket 4 by going downward in chamber 115 and upward in chamber 118 and thus extracts the lactam from the granules or chips in pocket 4.

Finally the liquid in an analogous manner is introduced into pockets 5 and 6. For this purpose, pocket 6 has an additional valve 121c so that the liquid, after having passed through pockets 3 to 6, can be discharged as extraction water rich with lactam into channel 137 and pipe 136.

While the pockets 3 to 6 are in operation in the control series just described, in the first control step, the valve 138 for the granules or chips supply above pocket 1 is open so that chambers 115 and 118 are filled with approximately the same amount of granules or chips through pipes 139 and 140. The amount introduced is metered by a preadjustment of the supply valve so that a predetermined amount of granules or chips uniformly flow in for each control step. Valve 121c of pocket 1 is opened at this time so that the granules or chips displace the liquid in the pocket in counterflow always to the flow of the granules or chips so that the liquid flows into annular channel 137. This begins the continuous extraction of the granules or chips and thus the supply and feeding of the same. All the other valves in pocket 1 remain closed during the filling process.

During the first control step, the valves 121a to c in the pocket 2 remain closed. However, at the beginning of the first control step, the bottom trap door 119 is opened so that the granules or chips can be dumped from pocket 2 into zone I to be intensively mixed there. After bottom trap door 119 is closed, the bottom discharge valve is opened and the granules or chips removed from zone I.

In the cycling switching of the valves as shown in FIG. 5, the continuous extraction proceeds and wherein in the second control step the pocket 2 is continuously filled with granules or chips and the water in the pocket displaced in counterflow.

Pockets 4 to 6 and 1 are switched in series and the extraction water passes through them in continuous counterflow. The lactam-rich water drains from pocket 1 while the trap door 119 is open in pocket 3 so that the granules or chips can flow into zone I.

In the described control arrangement with, for example, six pockets, there is always one pocket in filling action with granules or chips, four pockets already filled with granules or chips are switched in series, and one pocket being drained of granules or chips.

Thus the counterflow continuous extraction is maintained constantly while, at the same time, the switch-over is accomplished rhythmically according to program.

Two parallel paths of extraction are, for example, also possible through a selective switch-over for the control program. Thus pockets 1 and 4 are in filling action, pockets 3 and 6 are filled and in countercurrent flow, and pockets 2 and 5 are discharging the granules or chips.

A program is also possible with, for example, eight or even sixteen pockets. Thus pockets 1 and 5 are in filling action, pockets 3 and 4 as well as 7 and 8 are filled and in countercurrent flow, and pockets 2 and 6 are discharging granules or chips.

Also, it is possible to switch the pockets with three and more parallel flows.

The control program and number of pockets are selected according to the required dwell time, the desired extraction effect, the appropriate fill level of each pocket or the entire length of the granules or chips beds, and the amount of liquid and final concentration or the required overflow level of the liquid.

The extraction of time of 16 hours which has heretofore been conventional in, for example, a 4-charge operation to obtain a residual lactam content of 0.5% of the granules or chips weight can, in this invention, be reduced to from 8 to 12 hours.

The removal of the granules or chips from container 110 is also done with the outline of the control program.

The conical valve 130 closes pipe 129 in one position and when pipe 129 is open the valve closes the tube 202 and thus prevents the drawing in of the granules or chips. During this time, only the agitator blades 126 are operating and because of the secondary crossflow effect drives the granules or chips to the center of the container where they are drained through the opened pipe 129.

After the granules or chips removed from the apparatus are sifted, the extraction water drained off is immediately pumped back in order to again equalize the liquid level in container 110 which has dropped for a short time. Flow impulses in the granules or chips beds result from the lowering and rising of the liquid which is quite beneficial and promotes the extraction effect.

Pipe 129 is again closed by valve 130 within the control program outline as soon as one granules or chips charge has been discharged.

Thereafter the granules or chips of another pocket are drained into zone I by the opening of the respective bottom trap door 119 so that the granules or chips from this pocket are extracted as heretofore described.

As contrasted to the apparatus disclosed in said German application K 45 354, there is only changed, for example, the arrangement of valves 121a to c. In this case, appropriate slide valves or other types of valves are provided for manual operation and perhaps even automatically operated valves such as 121d in FIG. 3 for the communication between the liquid in the central tube 111 and the wall of container 110 as well as through the separating walls 117, FIG. 2. Such valves do not have to be closed absolutely tight because in this case they are not subject to pressure differences or only to small pressure differences as the extraction liquid is on both sides of the walls.

Based on various experiences with the different particle sizes making up the granules or chips and with regard to the optimum dwell time and/or the most favorable turn-over or largest capacity, a control rhythm can be obtained in such a manner that in the cyclic exchange a continuous switching of the pockets one after another with each upward and downward flow in the chambers 115 and 118 will occur. Thus the contiuous extraction operation and the counter flow between the solid matter and liquid is obtained. FIG. 5 shows only one example of a program for the reversal of the valves and the like.

In the modification of FIG. 3, a propeller-type agitator 204 is used instead of the pump 124 and agitator blades 126 of FIG. 1. The agitator 204 can be bought on the open market at a favorable price and is composed of a stationary funnel-like suction conveyor member 205 so that the agitator produces the required rotational flow in order to force the crossflow effect.

FIGS. 3 and 4 show the reversing valves 121d to f which have been previously mentioned in place of the slide valves which is a cost savings.

Technicians familiar with mechanical, hydraulic and process techniques can easily understand the apparatus techniques of this invention, including the switching program and see the posibility of other uses.

One essential advantage of this apparatus as compared to the conventional art is its compact construction and thus it can be made economically and operated at a reasonable cost with regard to heat insulation and energy consumption.

Thus the container for an input of 4.5 tons of granules or chips has a size of 13.5 m.$^3$, with a diameter of 2.4 m. and approximately 3.2 meters high and an outer heat deflecting surface of approximately 30 m.² Because the flow paths are divided into, for example, four up and four down flows in the pockets 2 to 6 of approximately a granules or chips height of 2 m. in each pocket, the total flow path is 16 m.

The comparative conventional extraction columns are from 8 to 12 meters high and therefore have a surface and volume ratio of 20 to 1 and more and because of this require a very expensive heating jacket which in this invention can be eliminated without harm.

In extraction columns, consideration must be taken that between the head and sump of a high column disturbing temperature differences occasionally occur and which are not possible in the apparatus of this invention which uses only a 2 to 3 m. liquid height and uses interior heating.

It is also possible in the apparatus of this invention to selectively adjust or subsequently change the lengths of the flow paths within certain limits by a change of the number of pockets which are switched in series and/or parallel, this being a feature not possible with conventional apparatuses.

The long water extraction path which can be selected and adjusted while moving through the various granules or chips beds guarantees an optimum extraction even when the operating conditions are changed, as, for example, the granules or chips particle sizes, temperatures, lactam concentration, volume or throughput of water and the like. Such cannot be done in conventional extraction columns with their generally irregular and quick-falling granules or chips particles. In the apparatus of this invention, it is possible to obtain a uniform optimum extraction of all granules or chips particles. This generally also applies to the treatment of granular material in liquids. Any scatter extent of the final lactam content on the granules or chips is thus prevented.

When minimum quantities of water are used in order to obtain a high lactam concentration in the extraction water, that is with low flow velocities within the granules or chips particle bed or because of the low diffusing velocities, it is at times preferred to introduce the extraction water in pulses or to supply additional water into the individual or all pockets. In this way, the granules or chips bed can be lightly lifted without producing a swirling agitation of the granules or chips. Above all, it has been found that by doing this the liquid border layer having a heavy lactam concentration on the granules or chips is prevented and the concentration improved.

Thus pulsating flow results from the subsequent recycling of the extraction water by means of a pump after the granules or chips have been sifted out. Of course, it is possible that this pump can be controlled by a valve to put water in zone I or zone III, or can permit it to flow in the container under pressure and thus cause a pulsation.

In a conventional extraction apparatus, it has been observed that the average final lactam concentration in the extraction water did not exceed generally 6 to 8%, if dwell times and standing times that do not last too long, are to be avoided. It is known, however, that a following concentration increase by vaporization is very expensive. In the continuous counterflow extraction of this invention, it is possible to obtain without further effort a higher water extraction concentration because, when counterflow is used, which is analogous to heat exchange, more favorable results are obtained and the extraction effect is improved because the extraction water is introduced in pulses into the first pocket of zone III or is supplied with additives, such as methanol, which enhances the extraction.

The apparatus of this invention has a still further advantage over recently developed counter flow extraction in a column surrounded by a heated jacket and having a diameter to length ratio of from 1 to 40 to 1 to 5. This ratio means that considerable tube lengths are required in order to achieve sufficient throughput. However, such high columns always have the great disadvantage of the bad sliding characteristics and the tendency to cling to the rim or edge, especially when boiling point range temperature are used.

In such a case, the irregular falling velocity ratio and/or sinking of the granules or chips particles because of the diameter to length ratio extraction column has a disadvantageous effect on the behavior of the dwell time and/or the extraction effect.

Therefore the apparatus of this invention has two further advantages:

(1) The apparatus can have an operating granules or chips height of about 2 m. in the pockets so that it is assured that no higher pressure is put on the lower granules or chips layers.

In a conventional apparatus, the danger of the granules or chips particles to cake is from the start relatively high so that a time-consuming granules or chips particle removal is always necessary. However, in the apparatus of this invention, if the granules or chips particles do cake, then the granules or chips mass, after the trap door 119 has been opened, can be easily stirred from the top by using a pole and can be removed downwardly.

(2) In the granules or chips beds of this invention and after the granules or chips particles have been introduced into the pockets up to the removal to the zone I, that is during the pre-extraction and main extraction steps, no movement of the granules or chips takes place and the liquid velocity profile is hardly influenced by the diameter to length ratio of the pockets. However, it is because of this that the effective dwell time behavior and thus the extraction effect are always substantially more favorable than in conventional extraction columns.

Other conventional extractors not comparable to this invention are the carrousel extractors, beaker-type extractors which operate horizontally and/or vertically with a forceful mixed liquid flow in counter-, parallel- or cross-flow within one or several circulatory flows. The cost of such apparatus with regard to construction, wear and tear, heat insulation, space requirements, as well as operational costs are substantially higher.

Furthermore, the movement and direction of the liquid in such apparatus is different and does not permit an optimum effect because several zones for liquid supply, as well as passage and/or drip zones and/or collecting zones have to be alternately passed, all of which unavoidably results in a concentration mixing. Because of this, the concentration drop cannot be utilized to its optimum effect. Further, the extraction is not continuous because of the drip zone and it is impossible to prevent certain dead times and/or interruption of a continuous operation.

Finally, the beaker-type extractors have to be enclosed so that the process is performed in an oxygen-free atmosphere when, for example, nylon-6-granules or chips are to be extracted at about 100° C. to prevent oxidation and damaging yellow color. Again, the enclosing of the apparatus increases the initial investment and operation costs which do not occur in this invention, unless, of course, very special extraction liquids, such as benzene, are used and make necessary a closed container to prevent explosition danger.

The granules or chips particles in this invention are conducted from the start of the extraction process in a liquid that has a lactam content which constantly decreases and they do not even come into contact with the oxygen in the surrounding air. After extraction is finished, the granules or chips particles are removed from the contained and cooled in a protective sluice before they are removed for further processing.

Having now described the means by which the objects of this invention are obtained, I claim:

1. An apparatus for continuously separating liquids from granular solid matter comprising a cylindrical open top container having a vertical axis, centrifugal pump means mounted in said container on said axis for moving liquid upwardly through said container, a pipe having an outwardly diverging conical-shaped bottom portion coaxial with said pump means, a plurality of radially extending vertical walls between said pipe and said container for forming vertically extending pockets, closable first liquid passageways between the top portion of said pipe and said pockets, second closable liquid passageways between the upper part of said pockets and the outside of said container, vertical partition means concentric with said pipe in each pocket for dividing each pocket into two chambers, trap door means in the bottom of each pocket and spaced from and below said partition means, the container bottom spaced from and below said trap door means to form a first mixing zone therebetween, means for supplying liquid to said first mixing zone, said pipe forming a second mixing zone and said pockets forming a third mixing zone, channel means disposed about said container and connecting with said second closable liquid passageways at the tops of said pockets for removing liquid, means for introducing granular solid matter into the tops of said pockets, an axially disposed upwardly converging funnel-shaped member spaced above said container bottom an axially vertically disposed suction sleeve extending from beneath said funnel shaped member to said pump means for providing liquid flow communication therebetween, and a closable solids outlet in the container bottom beneath said funnel shaped member.

2. An apparatus as in claim 1, said pump means comprising a mixing and pumping rotor, a suction sleeve joined to and rotatable with said rotor, agitator blades attached to said suction sleeve, and a guide tube joined to said suction sleeve, and said apparatus further comprising valve means for withdrawing treated solid matter from said container through said bottom or for closing the bottom end of said guide tube, and heating means mounted in said container within the range of said agitator blades.

3. An apparatus as in claim 1, said pump means comprising a double-sided propeller type agitator mounted for rotation around said axis in said container, a guide tube joined to said agitator, and an upwardly opening funnel-like member communicating with the top of said tube.

References Cited

UNITED STATES PATENTS

| | | | |
|---|---|---|---|
| 1,892,331 | 12/1932 | Courthope | 23—272.6 |
| 2,856,270 | 10/1958 | Saeman | 23—273 |
| 3,071,447 | 1/1963 | Bernhardi | 23—273 |
| 3,218,133 | 11/1965 | Ebner | 23—273 |
| 3,306,710 | 2/1967 | Messing | 23—273 |
| 3,390,402 | 6/1968 | Goerg | 23—273X |

FOREIGN PATENTS

| | | | |
|---|---|---|---|
| 27,471 | 1896 | Great Britain | 23—273 |
| 418,725 | 1934 | Great Britain | 23—270 |
| 7,635 | 1955 | Germany | 23—273 |
| 39,218 | 1931 | France | 23—270 |
| 304,802 | 1931 | Germany | 23—270 |

NORMAN YUDKOFF, Primary Examiner

S. J. EMERY, Assistant Examiner

U.S. Cl. X.R.

23—272.6, 273, 310; 210—35; 209—159